April 26, 1932. A. F. VICTOR 1,855,267
ADJUSTABLE REEL ARM FOR MOTION PICTURE APPARATUS
Filed April 24, 1930 2 Sheets-Sheet 1
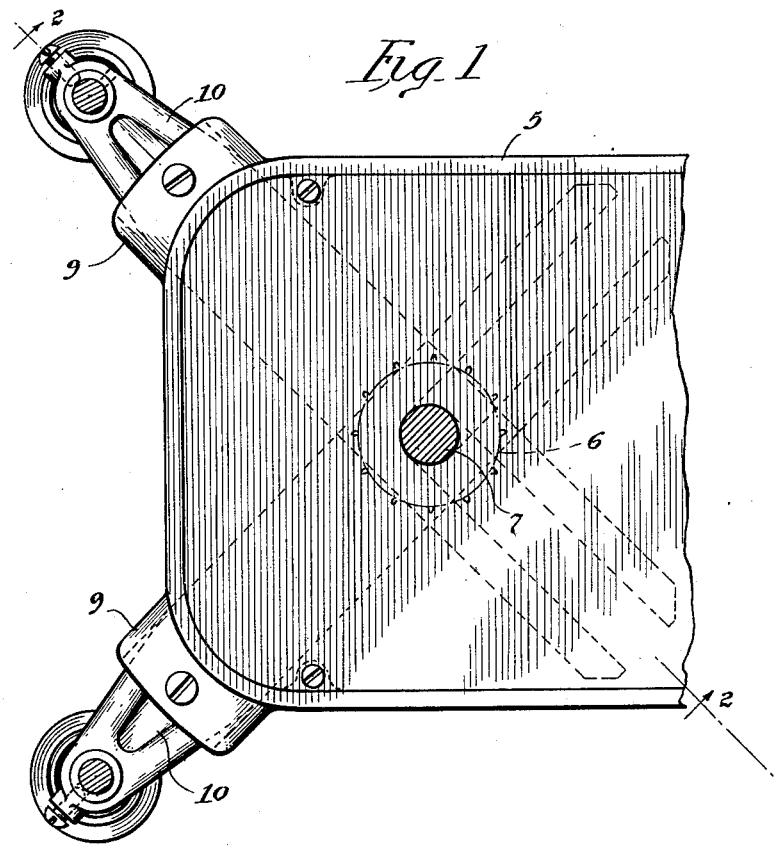
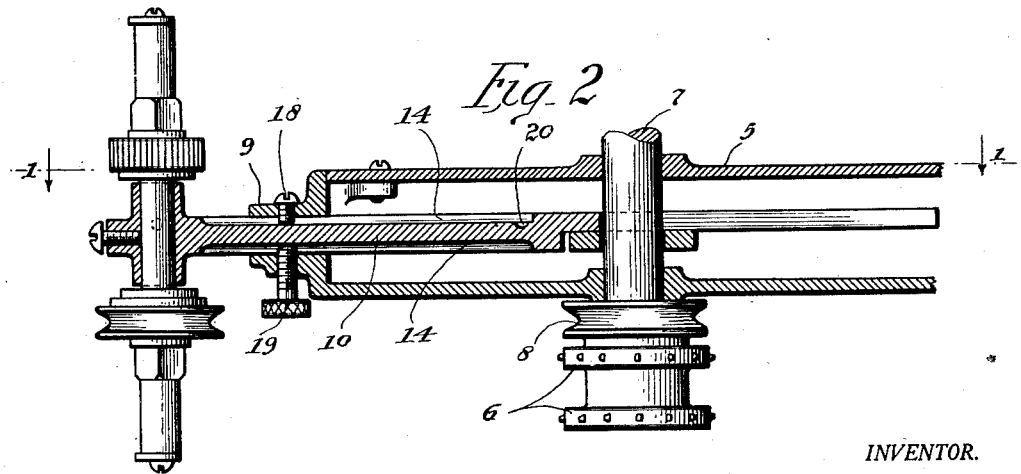
INVENTOR.
Alexander Ferdinand Victor
BY
ATTORNEY.

April 26, 1932.   A. F. VICTOR   1,855,267
ADJUSTABLE REEL ARM FOR MOTION PICTURE APPARATUS
Filed April 24, 1930   2 Sheets-Sheet 2
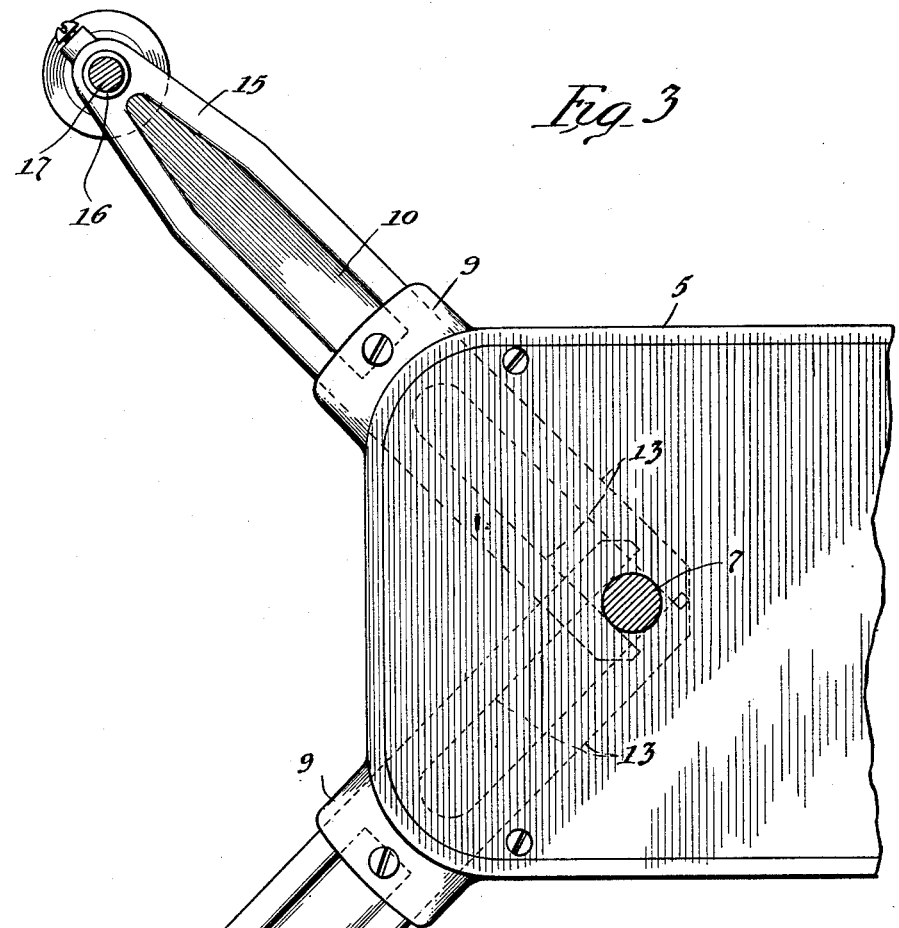
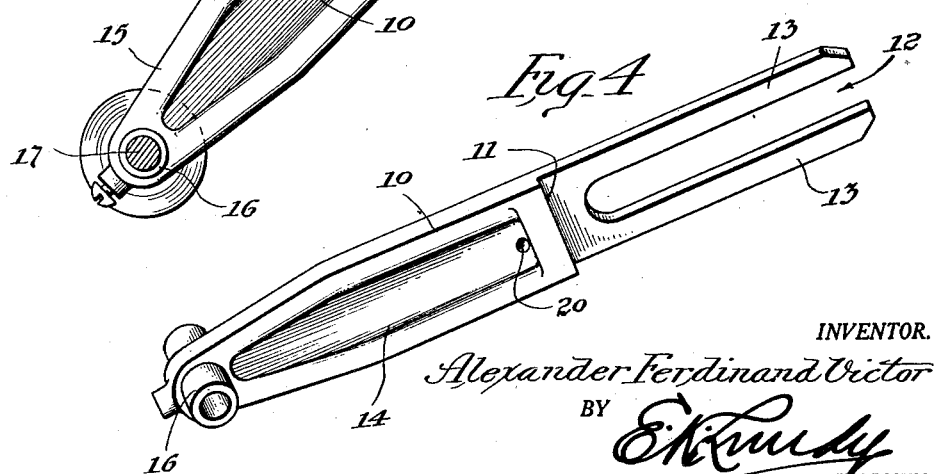
INVENTOR.
Alexander Ferdinand Victor
BY
ATTORNEY.

Patented Apr. 26, 1932

1,855,267

UNITED STATES PATENT OFFICE

ALEXANDER FERDINAND VICTOR, OF NEW YORK, N. Y.

ADJUSTABLE REEL ARM FOR MOTION PICTURE APPARATUS

Application filed April 24, 1930. Serial No. 446,996.

My present invention relates to motion picture apparatus and has more particular reference to a projector and the arms or other means thereon for mounting the spindles that carry the film spools or reels.

In the amateur motion picture art it is now the practice to use reels or spools of different diameters depending upon the lengths of the respective ribbons of film that are used. When a small reel is used the spindles may be mounted upon the projector with their axes nearer together than when the reels are of larger diameter. In order to accomplish this the arms carrying the reel spindles have to be removed and longer arms substituted.

In my apparatus the arms are of an adjustable type so that they may be shortened in length for the purpose of rendering the projector apparatus more compact when stored. Different structures may be employed to accomplish this extensibility of the spindle arms, and in the present instance I have provided arms that are telescopic and which are arranged lateral or transverse to each other and such disposition is radial to the feed driving-shaft.

In using the structure which embodies my present invention either or both arms may be extended to any desired distance within their range of movement and may be retracted into compact form. In devising this construction I have placed the arms in a constricted space within a part of the projector housing or casing and yet I have been able to provide each of said arms with two spaced bearings or guides that insure their stability in any adjustable position. This arrangement is such that the arms are mounted in a manner that will prevent lateral play in any direction.

I have numerous objects in view, among which are the provision of spindle-carrying arms that are novel in their construction and arrangement, are dependable and sturdy in use, which may be adjusted or reduced in length for the purpose of storage, and which may be economically manufactured without materially increasing the cost of the apparatus. I prefer to accomplish the numerous objects and to carry out my invention in substantially the manner hereinafter fully described and as more particularly pointed out in the claims, reference being herein made to the accompanying drawings that form a part in this specification.

In the drawings:—

Figure 1 is a vertical side elevation of a portion of a projecting apparatus showing my invention applied thereto.

Figure 2 is a section on line 2—2 of Figure 1 looking in the direction of the arrows and taken longitudinally of one of the arms.

Figure 3 is a view similar to Figure 1 showing the arms in extended positions.

Figure 4 is a perspective of one of the arms detached from the projector.

The drawings are to be understood as being schematic for the purpose of illustrating a typical or preferred form of my invention, and in said drawings similar reference characters have been employed to designate the same parts wherever they appear throughout the several views.

In the drawings 5 represents a fragmentary portion of a motion picture projector upon one side of which there is a film feed sprocket 6 that is secured upon a transversely disposed driving shaft 7 that is mounted in and passes through the portion 5 of the projector. The portion 5 of the projector is a flat box-like or rectangular shaped housing that projects forwardly from the other portion of the projector and the vertical side walls are spaced apart a distance sufficient to accommodate the transmission and actuating gears or other mechanism which is not shown and the space within said extension is necessarily constricted because of the presence of this mechanism. Intermediate the sprocket 6 and the housing 5 there is a pulley 8 that is fast on the shaft 7 so that the sprocket may be driven by a belt that connects pulley 8 with a pulley upon the reel mounting spindle carried by one or both of the arms.

At the upper and lower outer corners of the housing 5 are obliquely projecting stubs or sockets 9 the bores of which are in the form of elongated slots that aline radially with the shaft 7 and provide a portion of the means for mounting and guiding the spindle arms.

The spindle arms are preferably formed in the manner shown in Figure 4, from which it will be observed they comprise an elongated bar 10 which, about midway its length is provided with a shoulder 11 which reduces the thickness of the bar approximately one-half. The reduced portion of the bar is provided with an elongated slot 12 that extends to its end so that this portion of the bar which is positioned within the housing 5 is of a bifurcated character to provide spaced parallel members or fingers 13.

The width of the slots 12 in the arms is slightly greater than the diameter of the shaft 7 so that the parallel members 13 straddle said shaft in the manner shown in Figs. 1 and 3 and said shaft thereby acts as a guide for the inner ends of said arms. The reduced portions of the arms beyond the shoulder permits the inner portions of the arms to pass over or cross each other and, as the reduction in thickness is approximately one-half the normal thickness of the arms, the overlapped or over-set portions do not increase the combined thickness of the arms where they are crossed to engage with the shaft 7.

The outer portions of the arms, which are of the normal thickness of the bar 10 have slight depressions 14 upon opposite faces and are tapered towards their ends as at 15, while at their ends they are provided with tubular transversely disposed stubs 16 the bores of which aline and in which the spindle shaft 17 is mounted. Stops in the form of small screws 18 are screwed transversely through one of the walls of the sockets so that the inner ends of the stops enter the depressions 14 on the sides of the arms and the opposite walls of the sockets are provided with threaded apertures into which set-screws 19 are inserted to enter the depressions 14 upon the opposite sides of the bars 10. By releasing the set-screws 19 the arms may be moved inwardly or outwardly as the case may be and the outer movements are limited by the ends of the stops 18 engaging the transverse ends of the depressions 14. When an arm has been moved outwardly as far as desired its set-screw 19 is tightened and the arm is maintained in its adjusted position. The normal position for use in connection with small motion picture reels is shown in Fig. 1, but when larger reels are used the arms are drawn outwardly preferably as far as they may be moved and the set-screws adjusted to tighten the arms in their sockets.

In order to prevent slippage the inner ends of the depressions 14 are provided with small pockets 20 into which the inner end of the set-screw enters to insure a secure fastening.

From the foregoing it will be seen that I have provided spindle mounting arms that are rigid in any of their adjusted positions by reason of the fact that they are engaged at their sockets by the walls of the latter and at their inner portions by the shaft 7. In other words each arm is provided with two bearing points which render them very steady in any position to which they may be adjusted. Said arms may be readily adjusted when desired, and when the projector is to be stored the arms may be retracted into the housing to provide a compact structure.

It will be obvious that modifications or changes may be made in the structures and herein shown without departing from the principles involved. It will also be understood that the drawings and the detailed description herein given are for the purpose of clearness of understanding only and no unnecessary limitations are to be understood therefrom, but the appended claims should be construed as broadly as permissible in view of the prior art.

What I claim is:—

1. In a motion picture apparatus a support, a shaft journaled thereon, sockets on said support, reel arms movable longitudinally in said sockets and having their inner ends engaged with and guided by said shaft, means for maintaining said arms in adjusted positions, and means on the outer portions of said arms for rotatable mounting film reels.

2. In a motion picture apparatus a support, a shaft journaled thereon, reel arms having bifurcated ends that straddle said shaft and permit longitudinal movement of the arms independent of each other, means for guiding said arms at points removed from said shaft, and means on the outer portions of said arms for rotatable mounting film reels.

3. In a motion picture apparatus a support, reel arms having their inner portions bifurcated and disposed across each other, common means for guiding the bifurcated ends of said arms, guides for the opposite portions of said arms, and means on the outer portions of said arms for rotatable mounting film reels.

4. In a motion picture apparatus a support, a shaft journaled thereon, reel arms each having an elongated slot engaged by said shaft and permit rotation of said shaft and longitudinal movement of the arms independent of each other, guiding means for the opposite portions of said arms, and means on the outer portions of said arms for rotatable mounting film reels.

5. In a motion picture apparatus a support, reel arms each having a longitudinal slot and the slotted portions of said arms being disposed across each other, a common support for the slotted portions of said arms, means for guiding the opposite portions of said arms, and means on the outer portions of said arms for rotatable mounting film reels.

6. In a motion picture apparatus a housing, a shaft journaled transversely therein, reel arms disposed radially to said shaft and having slotted portions through which said shaft extends, the slotted portions of said arms being crossed, separate guides on said housing for the opposite portions of said arms, means for maintaining said arms in adjusted positions, and means on the outer portions of said arms for rotatable mounting film reels.

7. In a motion picture apparatus a support, crossed reel arms mounted thereon and having slotted portions that intersect each other, separate guides on said support for the unslotted portions of said arms, a transversely disposed member on said support engaged in the slots of said arms and affording a common guide for the adjacent portions of said arms, and means on the outer portions of said arms for rotatable mounting film reels.

8. In motion picture apparatus a reel mounting structure comprising a flat box-like housing, a rotatable shaft extended through the sides thereof, a pulley and sprocket mounted on said shaft, reel arms protruding from said housing radial to said shaft, the inner portions of said arms being slotted and crossed at said shaft whereby said shaft provides a common guide for said arms, guide stubs at spaced portions of said housing in which said arms are movable longitudinally, and spindles and pulleys mounted on the outer portions of said arms and actuated by said shaft, said spindles adapted for supporting film reels from which and to which reels the film is moved by said sprocket.

Signed at New York, in the county of New York and State of N. Y., this 11th day of March, 1930.

ALEXANDER FERDINAND VICTOR.